United States Patent
Madhu

(10) Patent No.: US 10,857,910 B2
(45) Date of Patent: Dec. 8, 2020

(54) VEHICLE SEATING SYSTEM

(71) Applicant: LEAR CORPORATION, Southfield, MI (US)

(72) Inventor: Adarsha B. Madhu, Novi, MI (US)

(73) Assignee: Lear Corporation, Southfield, MI (US)

( * ) Notice: Subject to any disclaimer, the term of this patent is extended or adjusted under 35 U.S.C. 154(b) by 1 day.

(21) Appl. No.: 16/222,297

(22) Filed: Dec. 17, 2018

(65) Prior Publication Data

US 2020/0189421 A1 Jun. 18, 2020

(51) Int. Cl.
| | |
|---|---|
| *B60N 2/02* | (2006.01) |
| *B60N 2/06* | (2006.01) |
| *B60N 2/12* | (2006.01) |
| *B60N 2/20* | (2006.01) |
| *B60N 2/22* | (2006.01) |
| *B60N 2/30* | (2006.01) |
| *B60N 2/64* | (2006.01) |
| *B60N 2/08* | (2006.01) |
| *B60N 2/075* | (2006.01) |

(52) U.S. Cl.
CPC ......... *B60N 2/0252* (2013.01); *B60N 2/0232* (2013.01); *B60N 2/075* (2013.01); *B60N 2/0881* (2013.01); *B60N 2/20* (2013.01)

(58) Field of Classification Search
CPC .... B60N 2/0252; B60N 2/0232; B60N 2/075; B60N 2/0881; B60N 2/20
USPC .... 297/378.1, 378.12, 378.14, 361.1, 362.11
See application file for complete search history.

(56) References Cited

U.S. PATENT DOCUMENTS

| | | | | | |
|---|---|---|---|---|---|
| 3,343,872 | A | * | 9/1967 | Reinmoller | B60N 2/2227 297/378.12 X |
| 3,356,415 | A | * | 12/1967 | Putsch | B60N 2/2352 297/378.12 |
| 4,294,488 | A | * | 10/1981 | Pickles | B60N 2/433 297/367 R |
| 4,432,583 | A | * | 2/1984 | Russo | B60N 2/0296 297/330 X |
| 4,573,738 | A | * | 3/1986 | Heesch | B60N 2/2213 297/362 |
| 4,657,125 | A | * | 4/1987 | Heesch | F16D 13/08 192/415 |
| 4,696,515 | A | * | 9/1987 | Heesch | B60N 2/2213 297/374 |
| 4,720,144 | A | * | 1/1988 | Heesch | B60N 2/2213 297/362 |
| 4,781,415 | A | * | 11/1988 | Heesch | B60N 2/2213 297/354.12 |
| 4,986,514 | A | * | 1/1991 | Ikegaya | B60N 2/2213 297/330 |
| 5,150,632 | A | * | 9/1992 | Hein | B60N 2/2352 297/366 |
| 5,156,439 | A | * | 10/1992 | Idlani | B60N 2/2352 297/367 R |

(Continued)

Primary Examiner — Rodney B White
(74) Attorney, Agent, or Firm — Brooks Kushman P.C.

(57) ABSTRACT

A seating system for a vehicle having a seat bottom and a seat back connected to and manually rotatable relative to the seat bottom may include a manually-actuated dump-and-return arrangement for the seat back and a manually-actuated slide arrangement for the seat bottom. It may also include a motor-actuated dump-and-return arrangement for the seat back and a motor-actuated slide arrangement for the seat bottom.

15 Claims, 4 Drawing Sheets

(56) References Cited

U.S. PATENT DOCUMENTS

| | | | | |
|---|---|---|---|---|
| 5,163,735 A | * | 11/1992 | Aljundi | B60N 2/42781 297/366 |
| 5,205,609 A | * | 4/1993 | Notta | B60N 2/2352 297/378.12 X |
| 5,248,184 A | * | 9/1993 | Morris | B60N 2/2231 297/362 |
| 5,322,346 A | * | 6/1994 | Notta | B60N 2/2352 297/362 |
| 5,435,624 A | * | 7/1995 | Bray | B60N 2/0232 297/362.11 X |
| 5,813,725 A | * | 9/1998 | Robinson | B60N 2/2352 297/362 |
| 5,918,940 A | * | 7/1999 | Wakamatsu | B60N 2/067 297/378.12 X |
| 6,158,811 A | * | 12/2000 | Hofschulte | B60N 2/0224 297/330 |
| 6,523,899 B1 | * | 2/2003 | Tame | B60N 2/01583 297/378.12 X |
| 6,540,295 B1 | * | 4/2003 | Saberan | B60N 2/206 297/378.1 X |
| 6,712,430 B2 | * | 3/2004 | Ito | B60N 2/0232 297/362 |
| 6,733,076 B2 | * | 5/2004 | Grable | B60N 2/0284 297/378.12 X |
| 7,066,543 B2 | * | 6/2006 | Yu | B60N 2/0232 297/378.12 X |
| 7,118,178 B2 | * | 10/2006 | Daniels | B60N 2/0232 297/378.1 |
| 7,210,734 B1 | * | 5/2007 | Yetukuri | B60N 2/06 297/378.12 X |
| 7,500,719 B2 | | 3/2009 | Kojima | |
| 7,661,760 B2 | * | 2/2010 | Nakaya | B60N 2/20 297/362.11 X |
| 7,726,742 B2 | * | 6/2010 | Keyser | B60N 2/2213 297/362.11 X |
| 7,775,594 B2 | * | 8/2010 | Bruck | B60N 2/20 297/362.11 X |
| 7,976,103 B2 | | 7/2011 | Gamache et al. | |
| 8,056,981 B2 | * | 11/2011 | Kojima | B60N 2/2213 297/362.11 |
| 8,100,478 B2 | * | 1/2012 | Ellison | B60N 2/3013 297/378.1 X |
| 8,388,067 B2 | * | 3/2013 | Hida | B60N 2/0232 297/362.11 |
| 8,746,773 B2 | | 6/2014 | Bruck | |
| 9,061,606 B2 | | 6/2015 | Mizuno et al. | |
| 9,156,377 B2 | | 10/2015 | Mixon et al. | |
| 9,789,787 B2 | * | 10/2017 | Wladimirow | B60N 2/36 |
| 9,902,296 B2 | * | 2/2018 | Keyser | B60N 2/20 |
| 10,195,962 B2 | * | 2/2019 | Bruck | B60N 2/20 |
| 10,232,741 B2 | * | 3/2019 | Takada | B60N 2/0228 |
| 10,279,712 B2 | * | 5/2019 | Bruck | B60N 2/874 |
| 10,363,841 B1 | * | 7/2019 | Santillan Gutierrez | B60N 2/0875 |
| 10,493,865 B2 | * | 12/2019 | Ellison | F16H 1/28 |
| 2002/0089223 A1 | * | 7/2002 | Yu | B60N 2/3013 297/362.11 |
| 2004/0195892 A1 | * | 10/2004 | Daniels | B60N 2/0232 297/378.1 |
| 2005/0017564 A1 | * | 1/2005 | Kayumi | B60N 2/01583 297/378.1 |
| 2006/0061183 A1 | * | 3/2006 | White | B60N 2/986 297/378.12 |
| 2006/0131946 A1 | * | 6/2006 | Andrigo | B60N 2/933 297/378.1 |
| 2011/0043024 A1 | * | 2/2011 | Kokubo | B60N 2/3013 297/378.1 |
| 2013/0026806 A1 | * | 1/2013 | Yamada | B60N 2/167 297/311 |
| 2014/0238188 A1 | * | 8/2014 | Ito | B60N 2/0228 74/664 |
| 2015/0321585 A1 | | 11/2015 | McCulloch et al. | |
| 2016/0039316 A1 | * | 2/2016 | Dill | B60N 2/2236 297/361.1 |
| 2016/0121758 A1 | * | 5/2016 | Wladimirow | B60N 2/0232 297/378.12 |
| 2017/0334314 A1 | * | 11/2017 | Takada | B60N 2/0296 |
| 2018/0037140 A1 | * | 2/2018 | Gollhardt | B60N 2/0232 |
| 2018/0244177 A1 | * | 8/2018 | Ferre | B60N 2/2213 |
| 2018/0304772 A1 | * | 10/2018 | Arakawa | B60N 2/3004 |
| 2018/0334054 A1 | * | 11/2018 | Higuchi | B60N 2/0232 |
| 2019/0084453 A1 | * | 3/2019 | Petit | B60N 2/0232 |
| 2019/0092191 A1 | * | 3/2019 | Bouzid | B60N 2/164 |
| 2019/0106018 A1 | * | 4/2019 | Rose | B60N 2/859 |
| 2019/0106019 A1 | * | 4/2019 | Rose | B60N 2/757 |
| 2019/0106038 A1 | * | 4/2019 | Rose | B60N 2/002 |
| 2019/0143851 A1 | * | 5/2019 | Handigol | B60N 2/20 297/341 |
| 2019/0168636 A1 | * | 6/2019 | Higuchi | B60N 2/075 |
| 2019/0168641 A1 | * | 6/2019 | Higuchi | B60N 2/067 |

\* cited by examiner

VEHICLE SEATING SYSTEM

TECHNICAL FIELD

The present disclosure relates to a seating system for a vehicle.

BACKGROUND

Various types of vehicle seating systems with tilting or sliding seats are known. Some are described in one or more of the following patent references: U.S. Pat. Nos. 7,500,719B2; 7,976,103B2; 8,746,773B2; 9,061,606B2; and 9,156,377B2.

SUMMARY

Embodiments described herein may include a seating system for a vehicle having a seat bottom and a seat back connected to the seat bottom. A tilt arrangement may be manually operable to facilitate rotation of the seat back relative to the seat bottom, including dumping the seat back forward as part of an easy-entry position. A slide arrangement may be manually operable to facilitate movement of the seat bottom forward as another part of the easy-entry position, and a motor arrangement may be operable to actuate the tilt arrangement and the slide arrangement to move the seat back and the seat bottom to the easy-entry position.

Embodiments described herein may include a seating system for a vehicle having a seat bottom and a seat back connected to and manually rotatable relative to the seat bottom. The seating system may also include a manually-actuated dump-and-return arrangement for the seat back, a manually-actuated slide arrangement for the seat bottom, a motor-actuated dump-and-return arrangement for the seat back, and a motor-actuated slide arrangement for the seat bottom.

Embodiments described herein may include a seating system for a vehicle having a seat bottom and a seat back connected to and manually rotatable relative to the seat bottom. The seating system may also include a tilt arrangement having a first powertrain operable to facilitate rotation of the seat back relative to the seat bottom, including dumping the seat back forward from a use position to an easy-entry position. A slide arrangement having a second powertrain may be operable to facilitate movement of the seat bottom forward from a use position to the easy-entry position. A manual actuator arrangement may be operable to actuate at least a portion of the first powertrain and at least a portion of the second powertrain to facilitate movement of the seat back and the seat bottom from the use position to the easy-entry position. A motor arrangement may be operable to actuate at least a portion of the first powertrain and at least a portion of the second powertrain to facilitate movement of the seat back and the seat bottom from the use position to the easy-entry position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
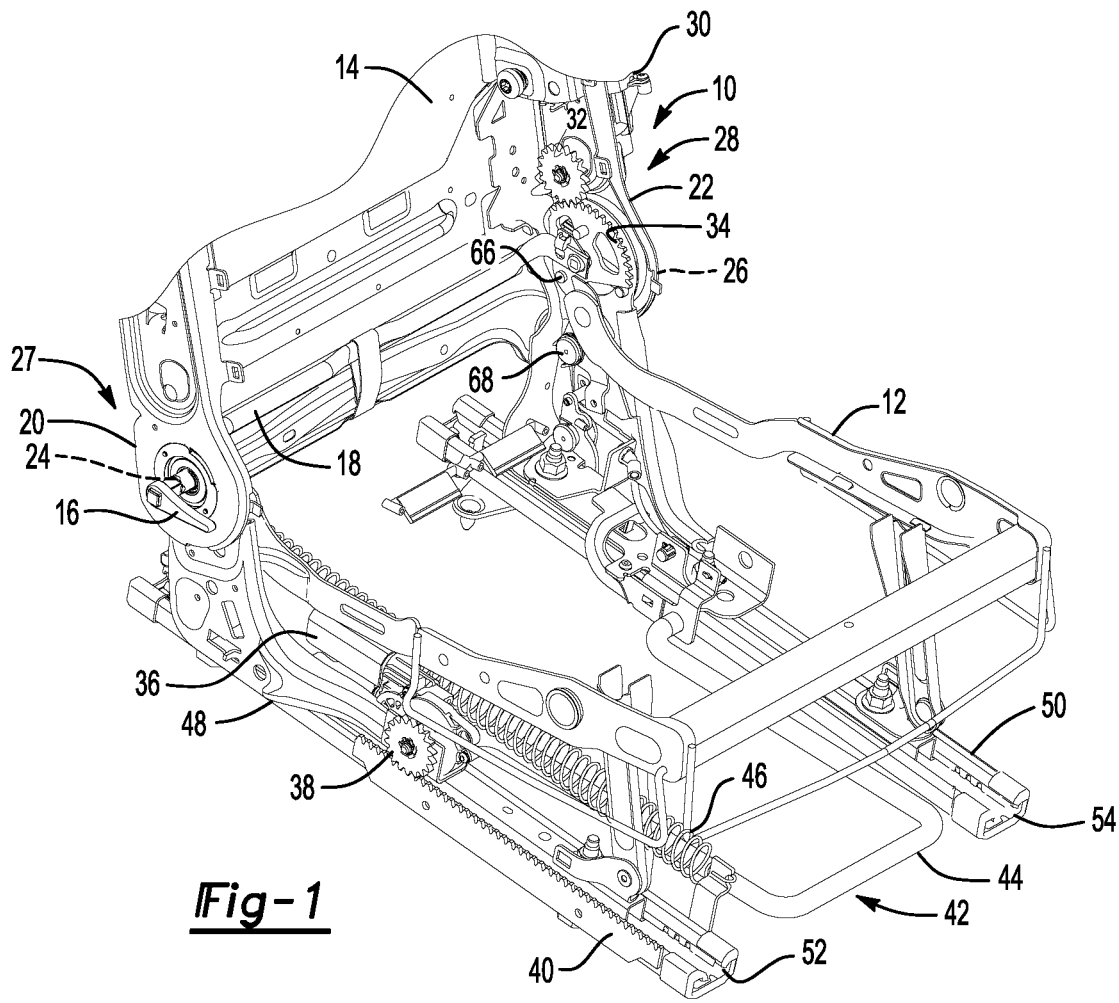
FIG. 1 shows a vehicle seating system in accordance with embodiments described herein.

FIG. 1 shows a seating system 10 in accordance with embodiments described herein. The seating system 10 includes a seat bottom 12 and the seat back 14 connected to the seat bottom 12. The seat back 14 is manually rotatable relative to the seat bottom 12 by actuating a first actuator, or release lever 16, which is connected to a recliner-release cross rod 18. When the cross rod 18 rotates, it actuates recliner mechanisms 20, 22 on either side of the seat back 14, which are configured to release the seat back 14 from a locked position. The recliner mechanisms 20, 22 may, for example, include a number of toothed pawls that engage a toothed ring, such as described in United States patent application publication no. US 2015/0321585 A1, published on Nov. 12, 2015, which is incorporated herein by reference.

Positioned adjacent to or as part of the recliner mechanisms 20, 22 are biasing members, which in this embodiment are torsion springs 24, 26. The springs 24, 26 bias the seat back 14 toward a forward, folded position. More specifically, the springs 24, 26 are configured to automatically tilt the seat back 14 forward to the easy-entry position when it is released from the locked position. The first actuator 16, the cross rod 18, the recliner mechanisms 20, 22, and the torsion springs 24, 26, are part of a tilt arrangement 27, which is manually operable to facilitate rotation of the seat back 14 relative to the seat bottom 12.

Figure 2:
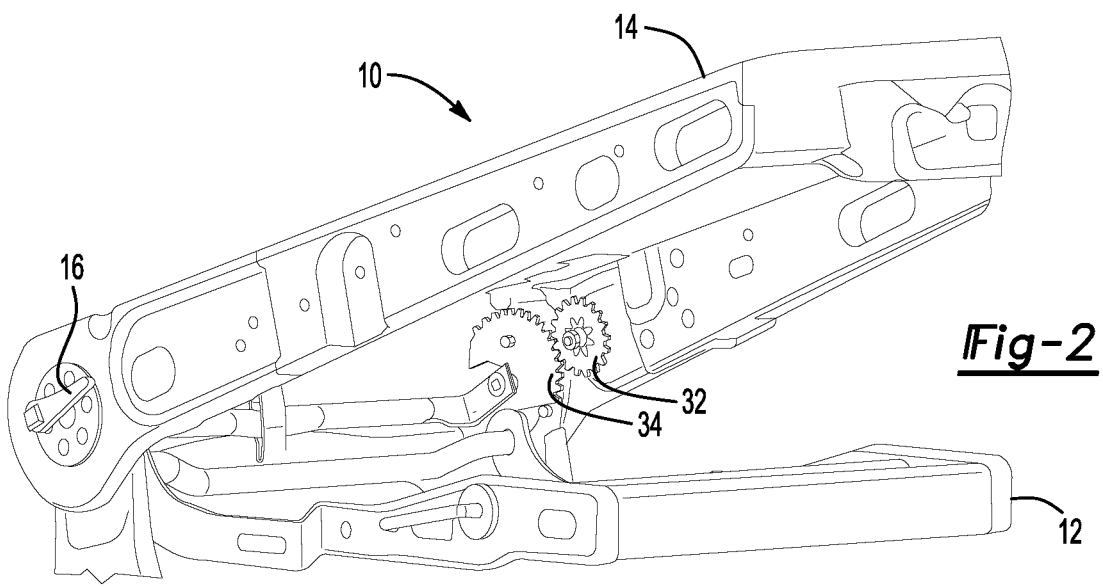
FIG. 2 shows a tilt arrangement associated with the seating system shown in FIG. 1.

FIG. 2 shows the seat back 14 folded forward into an easy-entry position for the seat back 14. In at least some embodiments, this may be approximately 32° from the design or use position shown in FIG. 1. In addition to being manually rotatable relative to the seat bottom 12, the seat back 14 can be dumped forward to the easy-entry position using a motor arrangement 28. As explained in more detail below, the motor arrangement 28 in this embodiment includes a first motor 30 and a first motor pinion 32, as well as a seat back gear 34, which intermeshes with the first motor pinion 32. The motor arrangement 28 may also include a second motor 36 and a second motor pinion 38, which intermeshes with a rack 40.

The seating system 10 includes a number of different mechanical and electro-mechanical systems for moving the seat back 14, the seat bottom 12, or both. For example, the cross rod 18, the recliner mechanisms 20, 22, the springs 24, 26, the first pinion 32, and the seat-back gear 34 form a first powertrain that is operable to facilitate rotation of the seat back 14 relative to the seat bottom 12, including dumping the seat back 14 forward from a use position to an easy-entry position. As described in more detail below, the first powertrain can be actuated manually or by one or more motors of a motor arrangement.

Figure 3:
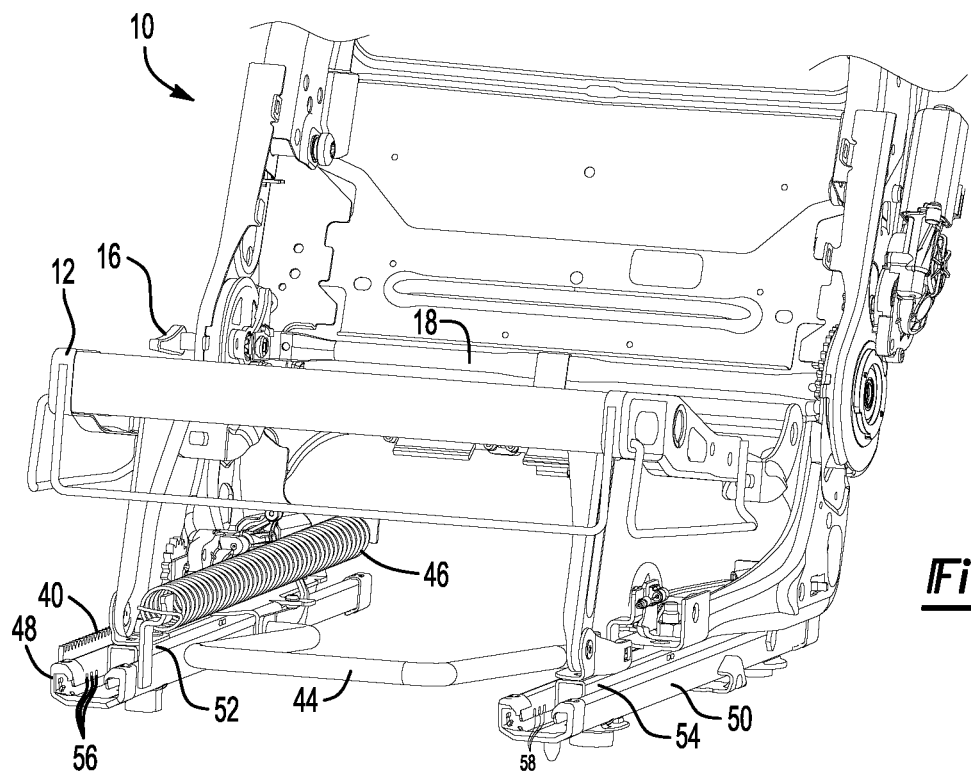
FIG. 3 shows a slide arrangement associated with the seating system shown in FIG. 1.
Figure 4:
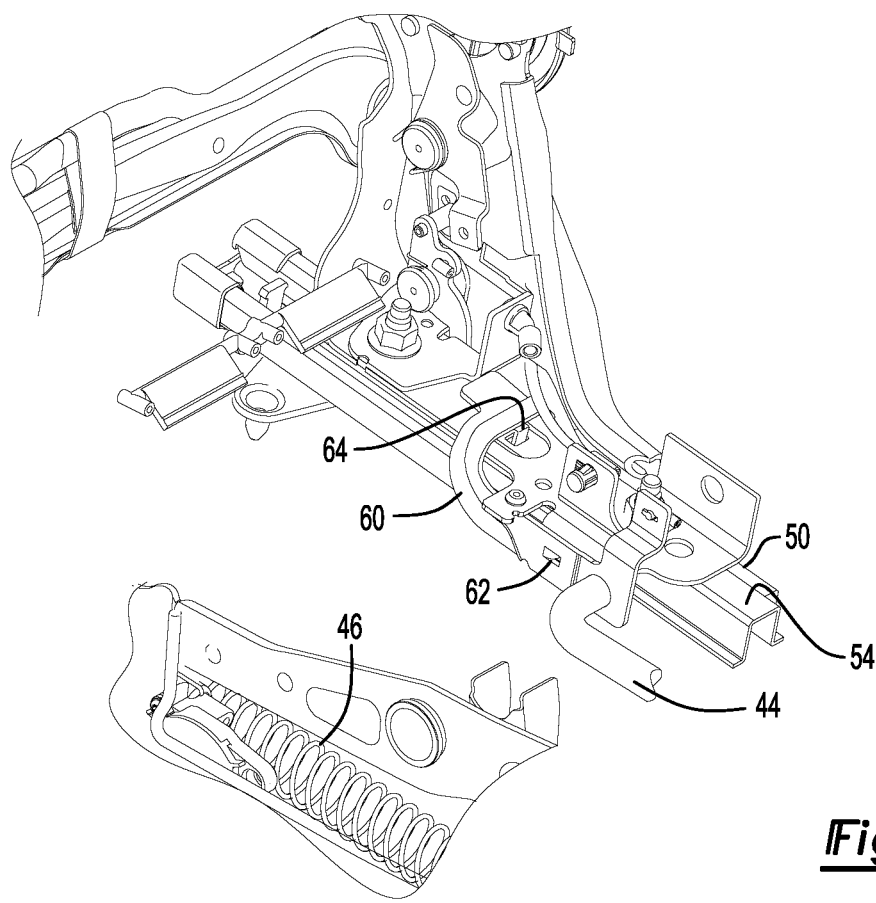
FIG. 4 shows detail of the slide arrangement shown in FIG. 3.

The seating system 10 also includes a slide arrangement 42, which is manually operable to facilitate movement of the seat bottom 12 forward as another part of the easy-entry position. The slide arrangement 42 includes a second actuator, or towel bar 44, which, as explained in more detail in conjunction with FIGS. 3 and 4, is configured to release the seat bottom 12 from a locked position. The towel bar 44 is a manual actuator, similar to the release lever 16; together they may be considered at least part of a manual actuator arrangement for the seating system 10. The slide arrangement 42 also includes a tension spring 46, which biases the seat bottom 12 toward the forward, easy-entry position. More specifically, the spring 46 is configured to automatically move the seat bottom 12 forward to the easy-entry position when it is released from the locked position. Fixed rails 48, 50 are part of a support structure for the seat bottom 12, which is slidable in the forward and rearward directions on sliding rails 52, 54.

The motor arrangement 28 is operable to actuate the tilt arrangement 27 and the slide arrangement 42 such that an operator has the option for manual actuation or motorized actuation. When the tilt arrangement 27 is manually actuated, the release lever 16 is moved in a counterclockwise position as oriented in FIGS. 1 and 2, which releases the recliner mechanisms 20, 22. The seat back 14 can then be tilted rearward within the range of use positions to accommodate occupant comfort, or it can be tilted forward into the easy-entry position as shown in FIG. 2. In this operation, the gear plate 34 remain stationary, while the motor pinion 32 rotates around it. To facilitate this, the first motor 30 may be configured to be back-drivable, or may be configured with a clutch that can be released, so that the motor 30 does not lock the pinion 32 and inhibit pivoting of the seat back 14.

In addition to allowing the seat back 14 to be tilted within the range of use positions, manually actuating the tilt arrangement 27 allows the seat back to be folded forward into a dump position such as shown in FIG. 2. Thus, the tilt arrangement 27 may also act as at least a portion of a dump-and-return arrangement for the seat back 14, which may be manually actuated or motor actuated. Once the seat back 14 is in the dump position, the release lever 16 may return to its original position, or it may remain in the actuated position, depending on the configuration of the recliner mechanisms 20, 22. To the extent that the release lever 16 remains in the actuated position, the seat back 14 may be manually tilted until the recliner mechanisms 20, 22 again engage, at which time, the release lever 16 could be rotated counterclockwise to release the seat back 14 and allow the occupant to adjust it into the desired use position.

FIGS. 3 and 4 illustrate operation of the slide arrangement 42. As described above, the seat bottom 12 has a locked position, and also has a release position in which it can slide in the forward and rearward directions. As shown in FIG. 3, the fixed rails 48, 50 include notches 56, 58, respectively. These notches 56, 58 may run along the fixed rails 48, 54 most or all of their length, and may be positioned on both sides of the respective sliding rail 52, 54. The sliding rails 52, 54 have tabs that cooperate with the notches 56, 58 to lock the sliding rails 52, 54 to their respective fixed rails 48, 50.

When the towel bar 44 is lifted upward, a release bracket 60—see FIG. 4—pivots about a connection 62 to the sliding rail 54 and pushes downward a release button 64, which acts to disengage the tabs of the sliding rail 54 from the notches 58 of the fixed rail 50. A similar arrangement is positioned on the other side of the seat bottom 12, so that both sliding rails 52, 54 are locked and released simultaneously by the movement of the towel bar 44. Once the sliding rails 52, 54 are released from the fixed rails 48, 50, the seat bottom 12 has a tendency to move in a forward direction because of the biasing action of the spring 46. When the slide arrangement 42 is manually adjusted, the operator positions the seat bottom in a desired location; however, when the slide arrangement 42 is actuated by the motor arrangement 28, the spring 46 pulls the seat bottom 12 into the forward, easy-entry position.

The release bracket 60, the spring 46, the sliding rails 52, 54, the second pinion 38, and the rack 40 form a second powertrain that is operable to facilitate movement of the seat bottom 12 forward from the use position to the easy-entry position. As described in more detail below, the second powertrain can be operated manually, or by one or more motors of a motor arrangement. Portions of the second powertrain may also be operable to facilitate movement of the seat bottom 12 rearward from the easy-entry position to the use position.

Figure 5:
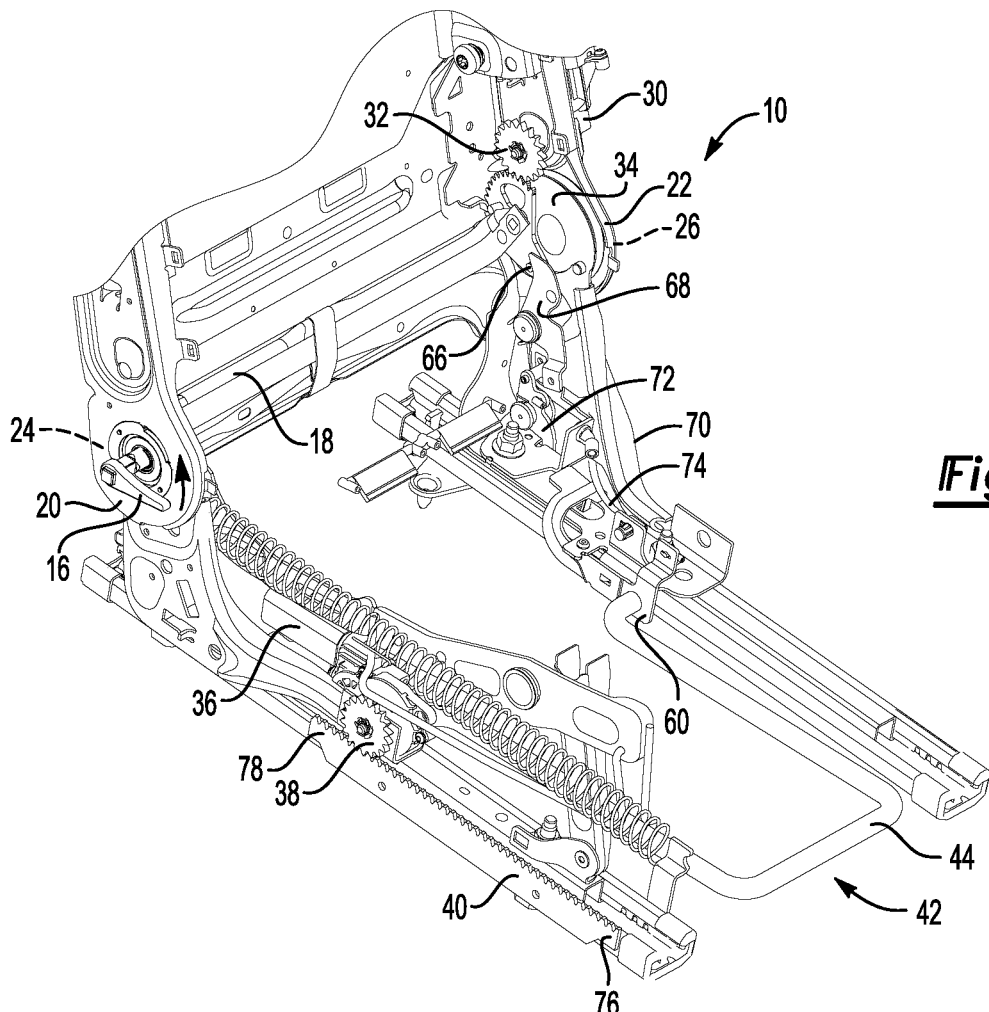
FIG. 5 shows motor actuation of the tilt arrangement shown in FIG. 2.
Figure 6:
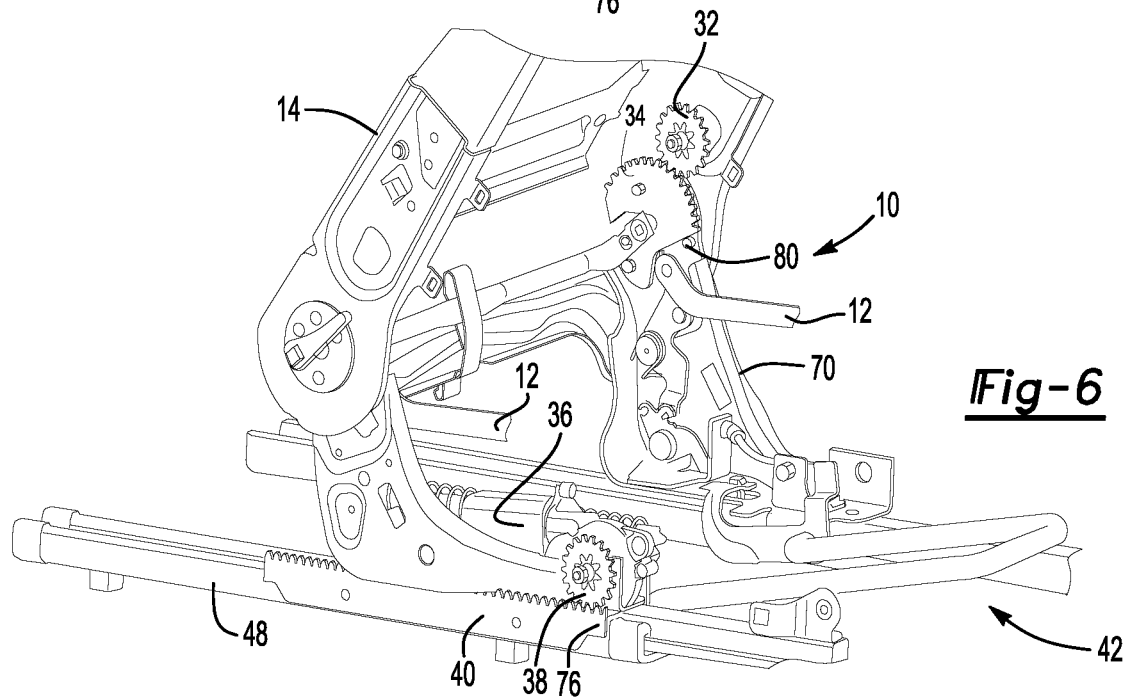
FIG. 6 shows motor actuation of the slide arrangement shown in FIG. 3.

FIGS. 5 and 6 illustrate motorized operation of the tilt arrangement 27—which in this embodiment is dump-and-return arrangement—and the slide arrangement 42. The motor-actuated dump-and-return arrangement, which in this embodiment includes the first motor 30, the motor pinion 32, the seat-back gear 34, the recliner mechanisms 20, 22, and the torsion springs 24, 26, operates as follows. First, the pinion 32 rotates in a clockwise direction as shown in FIG. 5. This rotates the seat-back gear 34 in a counterclockwise direction until a pin 66 contacts a release lever 68 pivotably attached to a portion of the seat frame 70. As shown in FIG. 1, when the seat back 14 is in the use position and the motor 30 has not been operated to actuate the tilt arrangement 27, the pin 66 on the seat-back gear 34 is positioned well behind the release lever 68. But as described above, rotation of the pinion 32 rotates the seat-back gear 34 until the pin 66 engages the release lever 68.

When the pin 66 contacts the release lever 68, the release lever 68 rotates in a clockwise direction as shown in FIG. 5. This in turn rotates a blocking member 72, which tensions a cable 74, thereby pulling a portion of the release bracket 60. When the cable 74 pulls the release bracket 60, the release bracket 60 pivots about the connection 62 and pushes downward on the release button 64 in the same way that it would have if the towel bar 44 had been manually actuated. As shown in FIG. 5, rotation of the seat-back gear 34 rotates the cross rod 18, which in turn unlocks the recliner mechanisms 20, 22. This causes the seat back 14 to pivot forward as shown in FIG. 6, just as if the tilt arrangement 27 was manually actuated.

Also shown in FIG. 6, the slide arrangement 42 has been released as described above, and the seat bottom 12—a portion of which was removed from FIG. 6 for clarity—has moved forward to the easy-entry position. As illustrated in FIG. 6, the second motor pinion 38 is positioned toward a front end 76 of the rack 40. Conversely, when the seat bottom 12 is in the use position as shown in FIG. 5, the pinion 38 is positioned toward a rear end 78 of the rack 40. The motor arrangement 28, and in particular the second motor 36, is operable to move the seat bottom 12 rearward from the easy-entry position shown in FIG. 6 to the use position shown in FIG. 5. Specifically, the second motor 36 rotates the pinion 38 in a counterclockwise direction as oriented in FIG. 6, and because the rack 40 is fixed, the seat bottom 12 moves rearward toward the use position.

The motor 36 may be connected to one or more controllers configured to send and receive signals to and from the motor 36, and in some embodiments, to and from the first motor 30. In some embodiments, dedicated motor controllers may be employed, and these may communicate through a controller area network or other communications system with other seat or vehicle-wide controllers. In this way, the motor 36 is operable to signal one or more of these controllers when it reaches a position in its rearward movement. A signal can then be sent to the first motor 32 reverse its operation so that the pinion 32 is rotated in a counterclockwise direction as oriented in FIG. 6. As illustrated in FIG. 6, the seat-back gear 34 is prohibited from rotating clockwise—which would be its natural reaction to the counterclockwise rotation of the pinion 32—because of a stop 80 held by the seat frame 70. Therefore, when the pinion 32 rotates in the counterclockwise direction, it pivots and the seat back 14 from the easy-entry position to the use position shown in FIG. 5.

As noted above, the rack 40 is fixed to the fixed rail 48, which means that the motor 36 needs to be back-drivable or the pinion 38 needs to be connected to the motor 36 by a clutch that can be disconnected when the seat bottom 12 is moved forward to the easy-entry position. FIGS. 7-11 illustrate a portion of a seating system 82 in accordance with embodiments described herein that includes a motor arrangement 84. The motor arrangement 84, includes a movable rack 86, a motor 88, and a pinion 90. The motor 88 may be a second motor, such as the second motor 36 described above, wherein a first motor is operable to actuate a tilt arrangement for a seat back.

The movable rack 86 is slidably connected to a structural member of the seat bottom, which in this embodiment is a fixed rail 92. Similar to the seating system 10 described above, a sliding rail 94 is movable in forward and rearward directions relative to the fixed rail 92. Also similar to the seating system 10, a seat bottom, such as the seat bottom 12, may be attached to and ride on the sliding rail 94—and an additional rail on the other side of the seat. The motor arrangement 86—and by implication its associated seat bottom—and the rack 86 are in the use position in FIG. 7. A front end 96 of the rack 86 is positioned at a stop 98 attached to the fixed rail 92.

Figure 8:
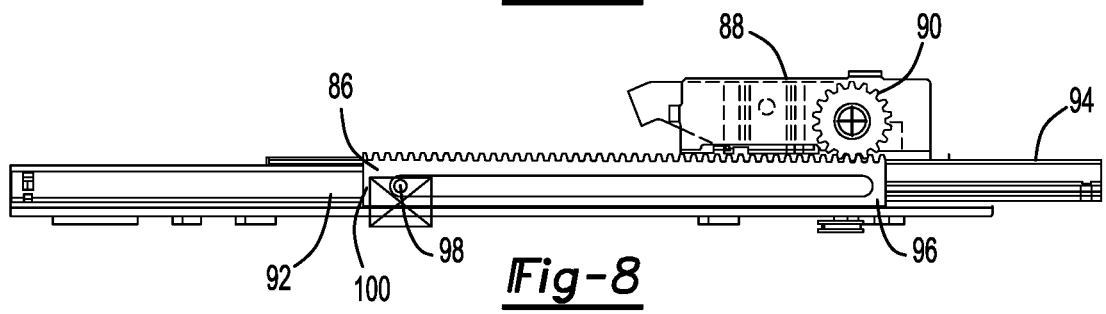

In FIG. 8, a slide arrangement, such as the slide arrangement 42, has been released so that the seat bottom moves from the use position to the easy-entry position. As illustrated in FIG. 8, the entire motor arrangement 84 has moved to the forward, easy-entry position. Thus, the position of the motor 88 relative to the front end 96 of the rack 86 is unchanged; however, the front end 96 is no longer adjacent to the stop 98, rather, a rear end 100 of the rack 86 is now adjacent to stop 98. With this configuration, the motor 88 does not need to be back-drivable nor does the pinion 90 need to be connected to the motor 88 with a clutch. This is because the pinion 90 does not need to rotate as the seat bottom is moved from the use position to the easy-entry position.

Figure 7:
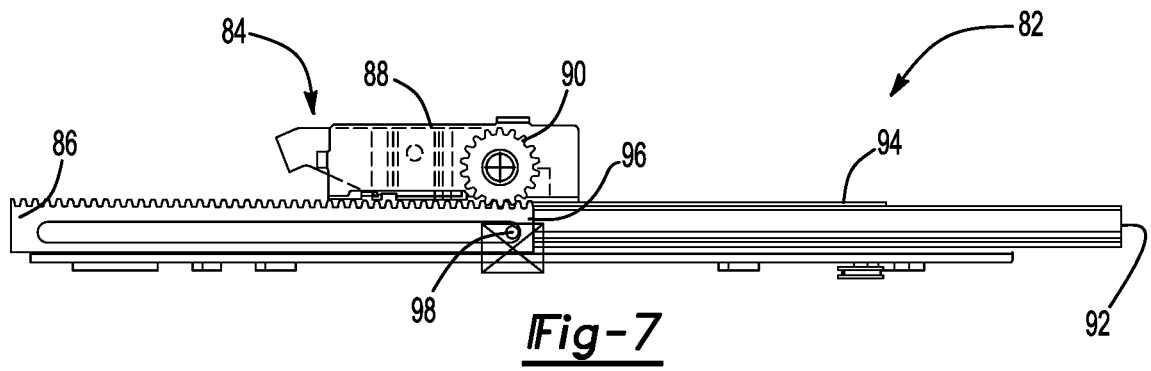
FIGS. 7-11 show a portion of a motor-actuated slide arrangement for a vehicle seating system in accordance with embodiments described herein.
Figure 9:
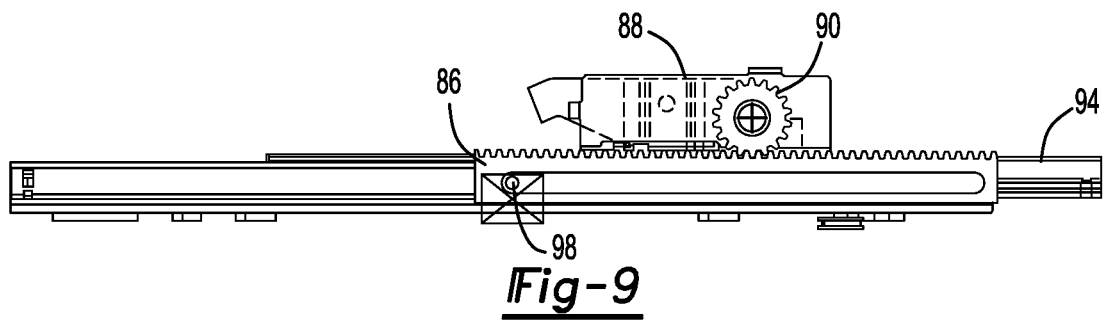
Figure 10:
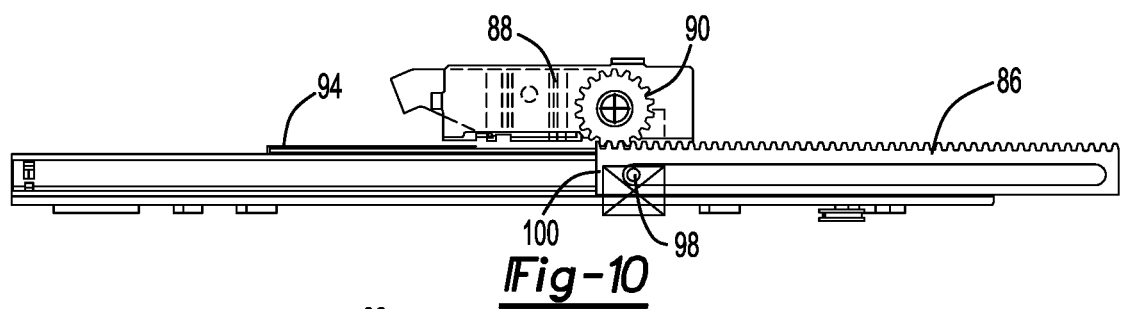
Figure 11:
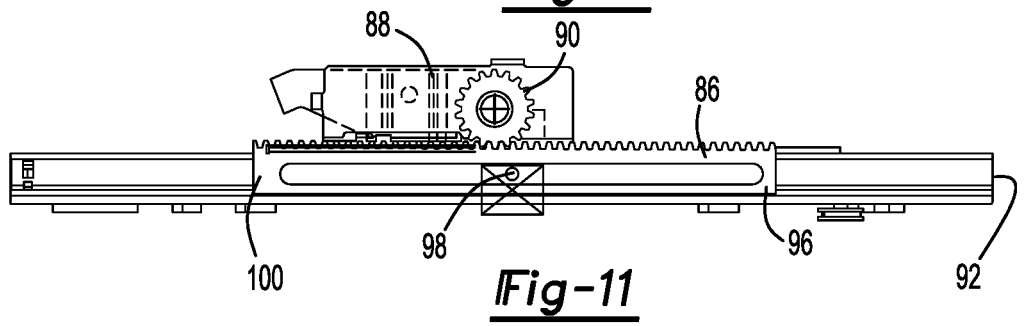

To return the seat bottom to the use position, the motor 88 is operated to rotate the pinion 90 counterclockwise as oriented in FIG. 9. Because the rack 86 is prohibited from moving forward because of the stop 98, the motor 88 and the sliding rail 94 move rearward. As noted above, the seat bottom will ride on the sliding rail 94 and will also move rearward. In FIG. 10, the rack 86 is in the same position as it was in FIG. 9—i.e., it is in a forward position relative to the fixed rail 94—but the motor 88 and the sliding rail 94 with its associated seat bottom have moved fully rearward and are now in the use position. The final step is for the rack 86 to be returned to its use position, and this is accomplished by operating the motor 88 to rotate the pinion 90 in a clockwise direction as oriented in FIG. 11. Because the front end 96 of the rack 86 is not impeded by the stop 98, rotation of the pinion 90 in the clockwise direction will cause the rack 86 to move rearward relative to the fixed rail 92. When the front end 96 of the rack 86 reaches the stop 98, movement of the rack 86 will be complete, and the entire arrangement will be in the use position as illustrated in FIG. 7.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seating system for a vehicle, comprising:
   a seat bottom;
   a seat back connected to the seat bottom;
   a tilt arrangement manually operable to facilitate rotation of the seat back relative to the seat bottom, including dumping the seat back forward as part of an easy-entry position;
   a slide arrangement manually operable to facilitate movement of the seat bottom forward as another part of the easy-entry position; and
   a motor arrangement operable to actuate the tilt arrangement and the slide arrangement to move the seat back and the seat bottom to the easy-entry position, and wherein the motor arrangement includes one motor operable to actuate the tilt arrangement and the slide arrangement to move the seat back and the seat bottom to the easy-entry position, and further includes a second motor operable to move the seat bottom rearward from the easy-entry position to a use position.

2. The seating system claim 1, wherein the motor arrangement is further operable to actuate the tilt arrangement and the slide arrangement to move the seat back and the seat bottom out of the easy-entry position and into the use position.

3. The seating system of claim 1, wherein the motor arrangement further includes a rack slidably connected to a structural member of the seat bottom and cooperating with the second motor such that the second motor and the rack move forward relative to the structural member and remain fixed relative to each other when the seat bottom is moved forward to the easy-entry position.

4. The seating system of claim 3, the rack further cooperating with the second motor such that the rack remains fixed in a forward position relative to the structural member when the second motor is operated to return the seat bottom from the easy-entry position to the use position.

5. The seating system of claim 4, wherein the second motor is operable to move the rack rearward relative to the structural member from the forward position when the rack is in the forward position and the seat bottom is in the use position.

6. A seating system for a vehicle, comprising:
   a seat bottom;

a seat back connected to and manually rotatable relative to the seat bottom;

a manually-actuated dump-and-return arrangement for the seat back and a manually-actuated slide arrangement for the seat bottom; and a motor-actuated dump-and-return arrangement for the seat back and a motor-actuated slide arrangement for the seat bottom, and wherein the manually-actuated dump-and-return arrangement includes a first actuator manually operable to provide non-motorized release of the seat back from a locked position and facilitate tilting of the seat back forward to an easy-entry position for the seat back, and the manually-actuated slide arrangement includes a second actuator separate from the first actuator and manually operable to provide non-motorized release of the seat bottom from a locked position and facilitate movement of the seat bottom forward to an easy-entry position for the seat bottom.

7. The seating system of claim 6, wherein the manually-actuated dump-and-return arrangement includes a biasing member configured to automatically tilt the seat back forward to the easy-entry position for the seat back when the seat back is released from the locked position, and the manually-actuated slide arrangement includes a biasing member configured to automatically move the seat bottom forward to the easy-entry position for the seat bottom when the seat bottom is released from the locked position.

8. The seating system of claim 6, wherein the motor-actuated dump-and-return arrangement and the motor-actuated slide arrangement include a motor operable to actuate the manually-actuated dump-and-return arrangement to release the seat back from the locked position and to actuate the manually-actuated slide arrangement to release the seat bottom from the locked position.

9. The seating system of claim 6, wherein the motor-actuated slide arrangement includes a motor operable to return the seat bottom from the easy-entry position for the seat bottom to a use position for a seat bottom.

10. The seating system of claim 9, wherein the motor-actuated slide arrangement further includes a gear connected to the motor and a rack connected to a structural member of the seat bottom and configured to intermesh with the gear, the rack being slidable relative to the structural member in forward and rearward directions.

11. The seating system of claim 10, wherein the motor-actuated slide arrangement is configured such that the gear and rack move forward relative to the structural member and remain fixed relative to each other when the seat bottom is moved forward to the easy-entry position for the seat bottom.

12. The seating system of claim 11, wherein the motor-actuated slide arrangement is further configured such that the gear rotates relative to the rack and the rack remains fixed in a forward position relative to the structural member when the motor is operated to return the seat bottom from the easy-entry position for the seat bottom to the use position for a seat bottom.

13. The seating system of claim 12, wherein the motor is operable to rotate the gear to move the rack rearward relative to the structural member from the forward position when the rack is in the forward position and the seat bottom is in the use position for the seat bottom.

14. A seating system for a vehicle, comprising:

a seat bottom;

a seat back connected to and manually rotatable relative to the seat bottom;

a first powertrain operable to facilitate rotation of the seat back relative to the seat bottom, including dumping the seat back forward from a use position to an easy-entry position;

a second powertrain operable to facilitate movement of the seat bottom forward from a use position to the easy-entry position;

a manual actuator arrangement operable on at least a portion of the first powertrain and at least a portion of the second powertrain to facilitate movement of the seat back and the seat bottom from the use position to the easy-entry position;

at least one motor operable on at least a portion of the first powertrain to facilitate movement of the seat back and the seat bottom from the use position to the easy-entry position, and wherein the at least one motor includes a first motor operable on at least a portion of the manual actuator arrangement to facilitate movement of the seat back and the seat bottom from the use position to the easy-entry position; and at least one other motor operable on at least a portion of the second powertrain to facilitate movement of the seat bottom from the easy-entry position to the use position.

15. The seating system of claim 14, wherein the manual actuator arrangement includes a first actuator manually operable to release the seat back from a locked position and facilitate tilting of the seat back forward to the easy-entry position, and a second actuator separate from the first actuator and manually operable to release the seat bottom from a locked position and facilitate movement of the seat bottom forward to the easy-entry position.

\* \* \* \* \*